United States Patent
Yasuda

(10) Patent No.: US 8,854,300 B2
(45) Date of Patent: Oct. 7, 2014

(54) INFORMATION PROCESSING APPARATUS, INFORMATION PROCESSING METHOD, AND PROGRAM

(75) Inventor: Ryouhei Yasuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 132 days.

(21) Appl. No.: 13/594,114

(22) Filed: Aug. 24, 2012

(65) Prior Publication Data

US 2013/0050074 A1 Feb. 28, 2013

(30) Foreign Application Priority Data

Aug. 31, 2011 (JP) ................. 2011-190201

(51) Int. Cl.
| G09G 5/00 | (2006.01) |
| H04N 21/41 | (2011.01) |
| H04N 21/422 | (2011.01) |
| G06F 1/16 | (2006.01) |
| H04N 5/44 | (2011.01) |

(52) U.S. Cl.
CPC .......... *G06F 1/1694* (2013.01); *H04N 21/4126* (2013.01); *H04N 21/42222* (2013.01); *H04N 21/42202* (2013.01); *H04N 5/4403* (2013.01)
USPC .......................................... 345/156; 345/157

(58) Field of Classification Search
USPC ................................................ 345/156–184
See application file for complete search history.

(56) References Cited

U.S. PATENT DOCUMENTS

| 2011/0105096 A1* | 5/2011 | Dods et al. ..................... 455/418 |
| 2013/0021373 A1* | 1/2013 | Vaught et al. ................. 345/633 |
| 2013/0024778 A1* | 1/2013 | Reeves et al. ................. 715/744 |

FOREIGN PATENT DOCUMENTS

JP 2007-286812 11/2007

* cited by examiner

*Primary Examiner* — Dmitriy Bolotin
(74) *Attorney, Agent, or Firm* — Finnegan, Henderson, Farabow, Garrett & Dunner, LLP

(57) ABSTRACT

An information processing apparatus includes an operating data generation unit and a connection determination unit. The operating data generation unit is configured to acquire detection information generated in accordance with a detection result of a detection unit capable of detecting a change in position of an electronic apparatus including a connection unit which is capable of connecting to a predetermined external apparatus in space and generate operating data based on the detection information. The connection determination unit configured to determine a connection state between the connection unit and the external apparatus. The operating data generation unit generates the operating data based on the connection state determined by the connection determination unit.

15 Claims, 15 Drawing Sheets

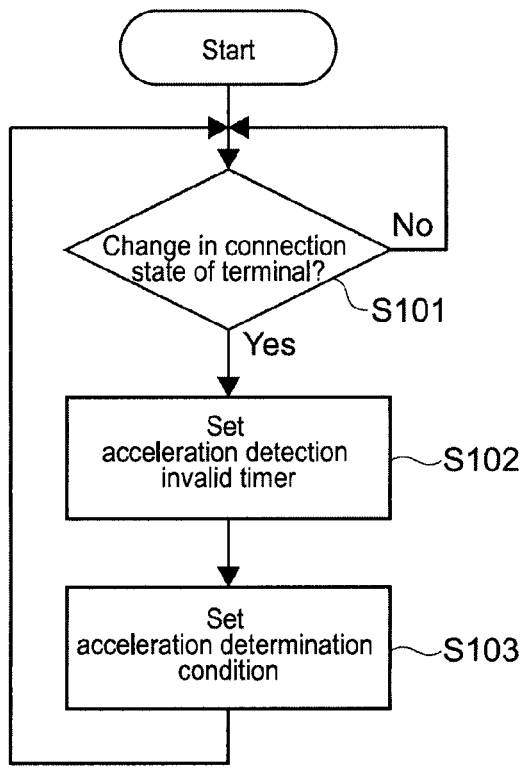

| Determination condition | Connection state of external terminal | | | |
|---|---|---|---|---|
| | (4) | (3) | (2) | (1) |
| | Second terminal is connected | | Second terminal is unconnected | |
| | First terminal is connected | First terminal is unconnected | First terminal is connected | First terminal is unconnected |
| Threshold value of acceleration in X-axis direction | 60 | 80 | 80 | 100 |
| Threshold value of acceleration in Y-axis direction | 70 | 70 | 100 | 100 |
| Threshold value of acceleration in Z-axis direction | 80 | 80 | 100 | 100 |
| Number of inversions of acceleration in X-axis direction | 1 | 2 | 1 | 2 |
| Inversion cycle of acceleration in X-axis direction | 1000 | 500 | 800 | 400 |

INFORMATION PROCESSING APPARATUS, INFORMATION PROCESSING METHOD, AND PROGRAM

BACKGROUND

The present disclosure relates to an information processing apparatus, an information processing method, and a program, that perform processing in accordance with a change in position of a portable electronic apparatus in space.

In recent years, there have been various portable electronic apparatuses such as a cellular phone, a smartphone, a remote controller, a game device, and an audio device. In the field of such a portable electronic apparatus, those configured to detect a change in position of the portable electronic apparatus in space that has been generated when a user holds the portable electronic apparatus and shakes it in one direction, i.e., performs a shaking operation, and perform processing in accordance with the detection result, have been known (see, for example, Japanese Patent Application Laid-open No. 2007-286812, hereinafter referred to as Patent Document 1).

SUMMARY

In the portable electronic apparatus disclosed in Patent Document 1, a terminal for headphones is provided. If a shake caused when a user attaches/removes the terminal for headphones is detected as the shaking operation, processing corresponding to the shaking operation may be performed at a user's unintended timing. Other than that, in this type of a portable electronic apparatus, since there is a problem in terms of user operability and convenience for putting it into practical use, the portable electronic apparatus is expected to be improved.

In view of the circumstances as described above, there is a need for an information processing apparatus, an information processing method, and a program, that are excellent in user operability and convenience.

According to an embodiment of the present disclosure, there is provided an information processing apparatus including an operating data generation unit configured to acquire detection information generated in accordance with a detection result of a detection unit capable of detecting a change in position of an electronic apparatus including a connection unit which is capable of connecting to a predetermined external apparatus in space and generate operating data based on the detection information, and a connection determination unit configured to determine a connection state between the connection unit and the external apparatus, the operating data generation unit generating the operating data based on the connection state determined by the connection determination unit.

It is possible to increase sensitivity of detection by changing a threshold value in accordance with a connection state of a terminal of the external apparatus with respect to the connection unit. Accordingly, it is possible to generate desired operating data even if it is difficult for a user to operate due to interference of the external apparatus.

In the information processing apparatus according to this embodiment, the operating data generation unit may generate the operating data based on the detection information and a predetermined threshold value, and the information processing apparatus may further include a threshold value setting unit configured to set the threshold value in accordance with the connection state determined by the connection determination unit.

It is possible to increase the sensitivity of detection by changing the threshold value in accordance with the connection state of the terminal of the external apparatus with respect to the connection unit. Accordingly, it is possible to generate the desired operating data even if it is difficult for the user to operate due to the interference of the external apparatus.

The detection information may be information based on an acceleration of the electronic apparatus, and the threshold value setting unit may set a threshold value of an acceleration in a case where the connection determination unit determines that the connection unit and the external apparatus are connected with each other to be lower than a threshold value of an acceleration in a case where the connection determination unit determines that the connection unit and the external apparatus are not connected with each other.

When the external apparatus is connected to the connection unit, since the weight of an object to be held may become large, it may be difficult to operate due to the external apparatus, or there is a risk that the terminal may come out, it is difficult for the user to operate quickly. In this regard, it is possible to acquire the desired operating data by setting the threshold value of acceleration to be lower than the threshold value set in a case where the connection unit is in an unconnected state and thus increasing the sensitivity, even if the user performs the operation relatively slowly.

The detection information may be generated in accordance with detections of accelerations of the electronic apparatus in triaxial directions by the detection unit, and the threshold value setting unit may set a threshold value of a specific acceleration which is an acceleration in a specific direction corresponding to a direction in which the external apparatus is connected to the connection unit to be lower than a threshold value of accelerations in biaxial directions other than the specific direction in a case where the connection determination unit determines that the connection unit and the external apparatus are connected with each other.

When the external apparatus is connected to the connection unit, since there is a risk that the terminal of the external apparatus may come out due to the operation in a connection direction, the weight of the object to be held may become large, or it may be difficult to operate due to the external apparatus, it is difficult for the user to operate quickly in the connection direction. In this regard, it is possible to acquire the desired operating data by setting the threshold value of acceleration in the connection direction to be relatively low and thus increasing the sensitivity, even if the user performs the operation relatively slowly.

The operating data generation unit may calculate the number of inversions of acceleration of the electronic apparatus based on the acceleration detected by the detection unit, and the threshold value setting unit may set a threshold value of the number of inversions of acceleration to be set in a case where the connection determination unit determines that the connection unit and the external apparatus are not connected with each other to be higher than a threshold value of the number of inversions of acceleration to be set in a case where the connection determination unit determines that the connection unit and the external apparatus are connected with each other.

When the external apparatus is connected to the connection unit, since there is a risk that the terminal of the external apparatus may come out, the weight of the object to be held may become large, or it may be difficult to operate due to the external apparatus, there is a possibility that the user does not perform the operations many times. In this regard, it is possible to acquire the desired operating data by setting the threshold value of the number of inversions of acceleration to be relatively low and thus increasing the sensitivity, even if the user performs the operation only a few times.

The operating data generation unit may calculate an inversion cycle of acceleration of the electronic apparatus based on the acceleration detected by the detection unit, and the threshold value setting unit may set a threshold value of the inversion cycle of acceleration to be set in a case where the connection determination unit determines that the connection unit and the external apparatus are not connected with each other to be lower than a threshold value of the inversion cycle of acceleration to be set in a case where the connection determination unit determines that the connection unit and the external apparatus are connected with each other.

When the external apparatus is connected to the connection unit, since the weight of the object to be held may become large, it may be difficult to operate due to the external apparatus, or there is a risk that the terminal may come out, it is difficult for the user to perform the operation quickly. In this regard, it is possible to acquire the desired operating data by setting the threshold value of an inversion cycle of acceleration to be relatively high and thus increasing the sensitivity, even if the user performs the operation relatively slowly.

The electronic apparatus may include a first connection unit and a second connection unit as the connection unit, the connection determination unit may determine which one of the first connection unit and the second connection unit has been connected to the external apparatus as the connection state, and the operating data generation unit may generate the operating data based on the connection state determined by the connection determination unit.

The operating data generation unit may calculate a detection effective value from a difference between the detection information and the threshold value and generate the operating data based on the detection effective value.

The threshold value setting unit may set a threshold value of accelerations in biaxial directions other than a specific direction, in which a user mainly moves the electronic apparatus, to be higher than a threshold value of an acceleration in the specific direction, the specific direction being determined in accordance with a position of the electronic apparatus including the connection unit to which the external apparatus is connected.

If the threshold values of accelerations in triaxial directions remain low, when an acceleration due to a shake of a key operation or the like is detected, the detection effective values of accelerations in triaxial directions become high and thus a value of resultant acceleration also becomes high. As a result, processing corresponding to the operation content is performed despite the intention of the user. In contrast, by setting the threshold values of accelerations in biaxial directions other than the direction in which the user mainly moves the electronic apparatus to be high, even if the acceleration due to the shake of the key operation or the like is detected, the detection effective values of the accelerations in biaxial directions become zero or small, and thus it is possible to maintain the value of the resultant acceleration low. As a result, it is possible to prevent the operation from being detected by mistake and the processing corresponding to the operation content from being performed despite the intention of the user. On the other hand, in a case where the user performs the operation voluntarily, by increasing the threshold values of accelerations in biaxial directions other than the axial direction in which the user mainly moves the electronic apparatus, even if the detection effective values of the accelerations in biaxial directions become zero or small, it is possible to obtain the desired resultant acceleration when the detection effective value of the acceleration in the direction in which the user mainly moves the electronic apparatus is sufficiently high.

The information processing apparatus according to this embodiment may further include a gesture recognition unit configured to recognize a predetermined operation gesture in accordance with a change in position of the electronic apparatus detected by the detection unit in space and a display control unit configured to display a display image which represents the operation gesture on a display unit, in which the operating data generation unit may generate the operating data in accordance with the operation gesture recognized by the gesture recognition unit.

The display control unit may change a display image to be displayed on the display unit in accordance with the connection state determined by the connection determination unit.

Accordingly, the user can recognize the direction of the operation instinctively.

The operating data generation unit does not need to generate the operating data for a predetermined period of time corresponding to a timing at which the connection determination unit determines a change in the connection state.

The information processing apparatus according to this embodiment may further include a processing execution unit configured to acquire the operating data and execute predetermined processing in accordance with the operation data thus acquired. In this case, the processing execution unit does not need to execute the processing for a predetermined period of time corresponding to a timing at which the connection determination unit determines a change in the connection state.

Accordingly, it is possible to prevent the processing corresponding to the operation from being performed at the user's unintended timing along with the shake when the user attaches/removes the terminal.

The detection unit may detect a change in position of the electronic apparatus in space by one of an acceleration sensor and image recognition.

That is, the information processing apparatus may be a portable electronic apparatus capable of detecting the change in position of the portable electronic apparatus in space that has been caused due to the operation by the acceleration sensor. Alternatively, an information processing apparatus other than the portable electronic apparatus in which the shaking operation is actually performed may detect the change in position of the portable electronic apparatus in space by image recognition.

According to an embodiment of the present disclosure, there is provided an information processing method including: acquiring, by an operating data generation unit, detection information generated in accordance with a detection result of a detection unit capable of detecting a change in position of an electronic apparatus including a connection unit which is capable of connecting to a predetermined external apparatus in space and generating operating data based on the detection information; determining, by a connection determination unit, a connection state between the connection unit and the external apparatus; and generating, by the operating data generation unit, the operating data based on the connection state determined by the connection determination unit.

According to an embodiment of the present disclosure, there is provided a program that causes a computer to function as an operating data generation unit configured to acquire detection information generated in accordance with a detection result of a detection unit capable of detecting a change in position of an electronic apparatus including a connection unit which is capable of connecting to a predetermined external apparatus in space and generate operating data based on the detection information and a connection determination unit configured to determine a connection state between the connection unit and the external apparatus, the operating data generation unit generating the operating data based on the connection state determined by the connection determination unit.

As described above, according to the embodiments of the present disclosure, an information processing apparatus, an information processing method, and a program, that are excellent in user operability and convenience can be provided.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 5 is a flowchart showing detection processing of a terminal state;

FIG. 6 is a table showing an example of a threshold value which is changed in accordance with connection states of a first terminal and a second terminal;

DETAILED DESCRIPTION OF EMBODIMENTS

Hereinafter, embodiments according to the present disclosure will be described with reference to the drawings.

First Embodiment

In a first embodiment, as an information processing apparatus, a portable electronic apparatus capable of detecting a change in position of the portable electronic apparatus in space that has been caused due to a shaking operation and performing processing in accordance with detection information by itself will be described.

Examples of such a portable electronic apparatus include a smartphone, a cellular phone, a tablet computer, and a PDA (Personal Digital Assistance).

[Hardware Configuration of Portable Electronic Apparatus]

Figure 1:
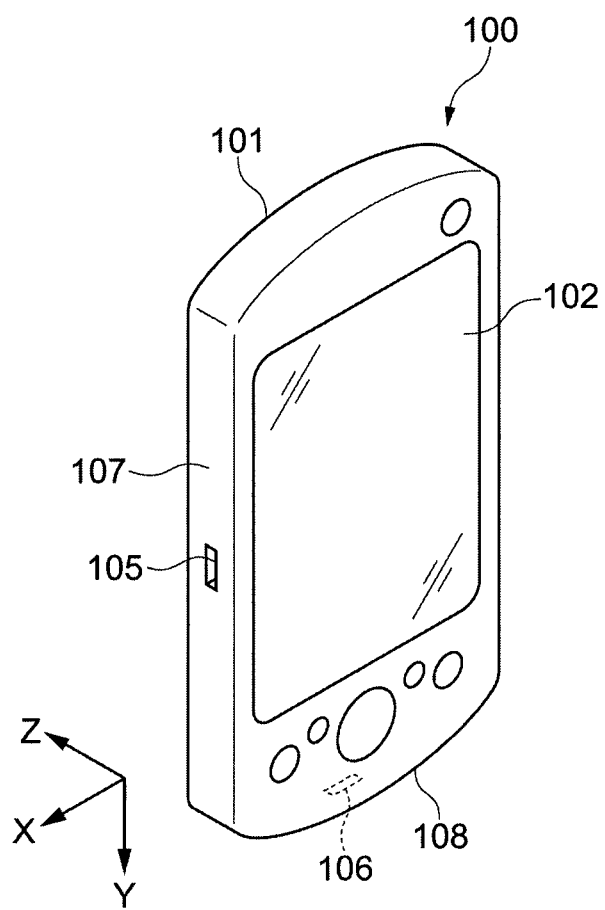
FIG. 1 is a perspective view showing an appearance image of a portable electronic apparatus according to a first embodiment of the present disclosure.

FIG. 1 is a perspective view showing an appearance image of a portable electronic apparatus 100 (an information processing apparatus and an electronic apparatus) according to a first embodiment of the present disclosure.

Figure 2:
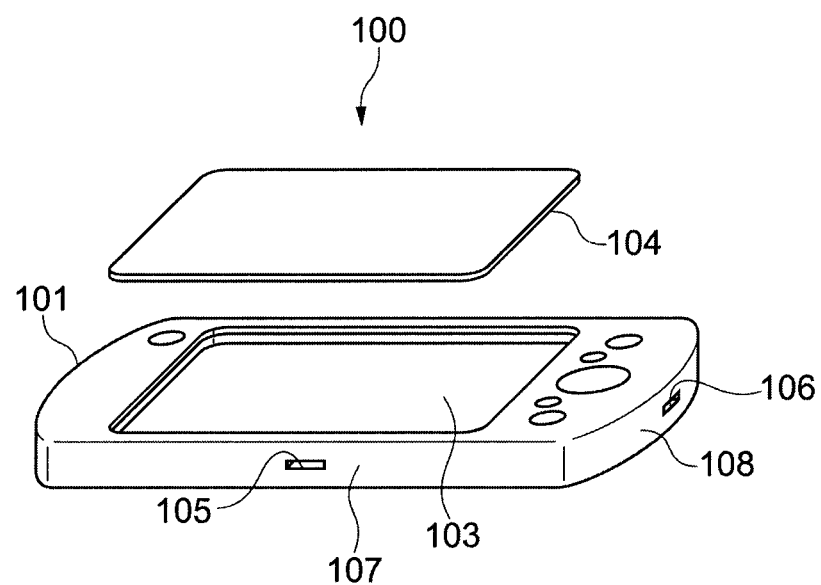
FIG. 2 is a perspective view for explaining a configuration of the portable electronic apparatus.

As shown in the figure, the portable electronic apparatus 100 includes a substantially-cubic casing 101 having a smaller thickness in a thickness direction (hereinafter referred to as Z-axis direction) than sizes thereof in a horizontal direction (hereinafter referred to as X-axis direction) and in a vertical direction (hereinafter referred to as Y-axis direction). In this embodiment, the casing 101 is of a size that a user is capable of holding in one hand or larger. A user can hold the portable electronic apparatus 100 and shake it in one direction, i.e., perform a shaking operation. The substantially-cubic casing 101 includes various kinds of electronic components constituting the portable electronic apparatus 100. A display unit 102 with a touch panel is disposed on one main surface of the casing 101. The main surface of the casing 101 and an input/output surface of the display unit 102 with the touch panel are disposed substantially flatly. The display unit 102 with the touch panel is constituted of, for example, a display panel 103 such as a liquid crystal display panel and an organic EL (electroluminescence) display panel and a touch panel 104 disposed on a screen of the display panel 103, as shown in FIG. 2. The touch panel 104 includes, for example, a capacitance touch panel 104 and may be any other touch panels as long as it can detect a plurality of locations which are designated by the user simultaneously. Examples of the touch panel 104 include a pressure-sensitive touch panel, an infrared ray type touch panel, and an audio touch panel.

Referring back to FIG. 1, a first terminal 105 (connection unit) is provided on the lateral surface (including Y-axis and Z-axis) 107 of the portable electronic apparatus 100. It is possible to connect a terminal of an external apparatus to the first terminal 105 by inserting it in the X-axis direction. A second terminal 106 (connection unit) is provided on the lower side surface (including X-axis and Z-axis) 108 of the portable electronic apparatus 100. It is possible to connect a terminal of an external apparatus to the second terminal 106 by inserting it in the Y-axis direction. Examples of the external apparatus include a charging cable, headphones, a cradle, an antenna, a microphone, and a speaker.

Figure 3:
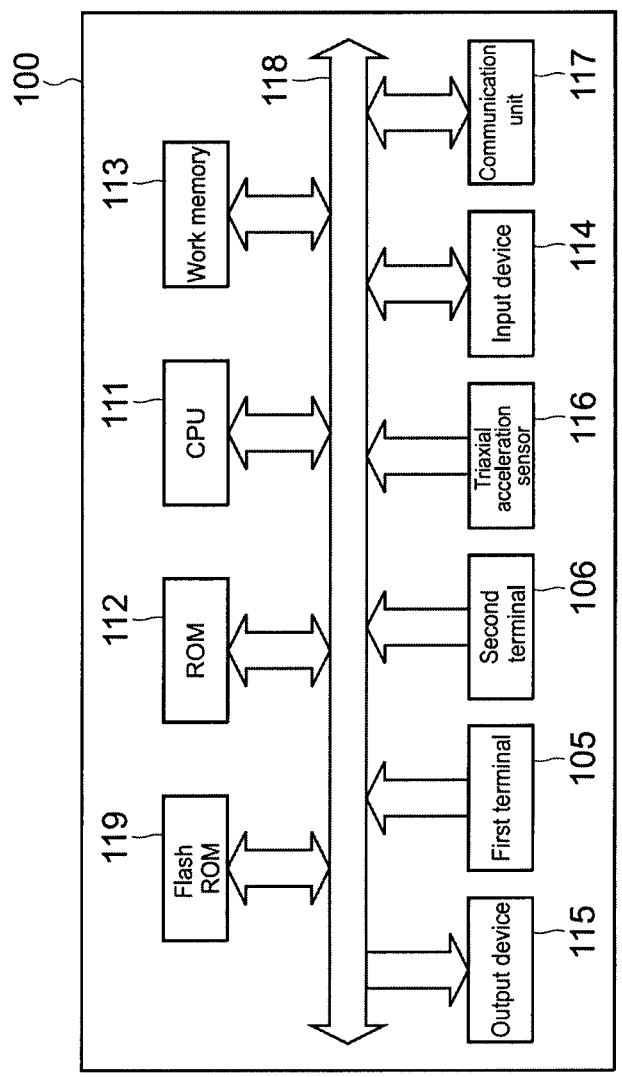
FIG. 3 is a block diagram showing a hardware configuration of the portable electronic apparatus.

FIG. 3 is a block diagram showing a hardware configuration of the portable electronic apparatus 100.

As shown in the figure, the portable electronic apparatus 100 is constituted of a CPU (Central Processing Unit) 111, a ROM (Read Only Memory) 112, a work memory 113, a flash ROM 119, an input device 114, an output device 115, a first terminal 105, a second terminal 106, a communication unit 117, a triaxial acceleration sensor 116 (detection unit), a bus 118, and the like.

In the portable electronic apparatus 100, the CPU 111 executes various processing in accordance with a program stored in the ROM 112 which is connected therewith via the bus 118.

In the ROM 112, a program executed by the CPU 111, various types of fixed data, or the like, is stored.

The work memory 113 is a memory which is used as a work space for arithmetic processing performed by the CPU 111.

The flash ROM 119 is a nonvolatile storage apparatus which can be rewritten.

The input device 114 is constituted of the touch panel 104 (FIG. 1 and FIG. 2), an input control circuit, and the like. The touch panel 104 is used as an input means for the user to input information. The input control circuit generates an input signal based on the input by the user and outputs it to the CPU 111. The user of the portable electronic apparatus 100 can input various types of data to the CPU 111 and instruct processing operation by operating the touch panel 104.

The output device 115 includes the display panel 103 (FIG. 2) as a display device. Furthermore, the output device 115 includes an audio output device such as a speaker.

The terminal of the external apparatus is electrically connected to the first terminal 105 and the second terminal 106.

The communication unit 117 performs wireless communication with a base station via radio waves.

The CPU 111 controls respective units constituting the portable electronic apparatus 100 and inputs/outputs of data among the respective units. Further, the CPU 111 can perform various processing by executing a program stored in the ROM 112 or the memory 113.

The triaxial acceleration sensor 116 can detect a change in position of the portable electronic apparatus 100 in space. The "change in position in space" is, specifically, respective accelerations in triaxial directions of XYZ. The triaxial acceleration sensor 116 outputs three signals corresponding to the respective accelerations thus detected in the triaxial directions of XYZ to the CPU 111. The CPU 111 A/D-converts and takes in the three signals output from the triaxial acceleration sensor 116.

[Functional Configuration of Portable Electronic Apparatus]

Figure 4:
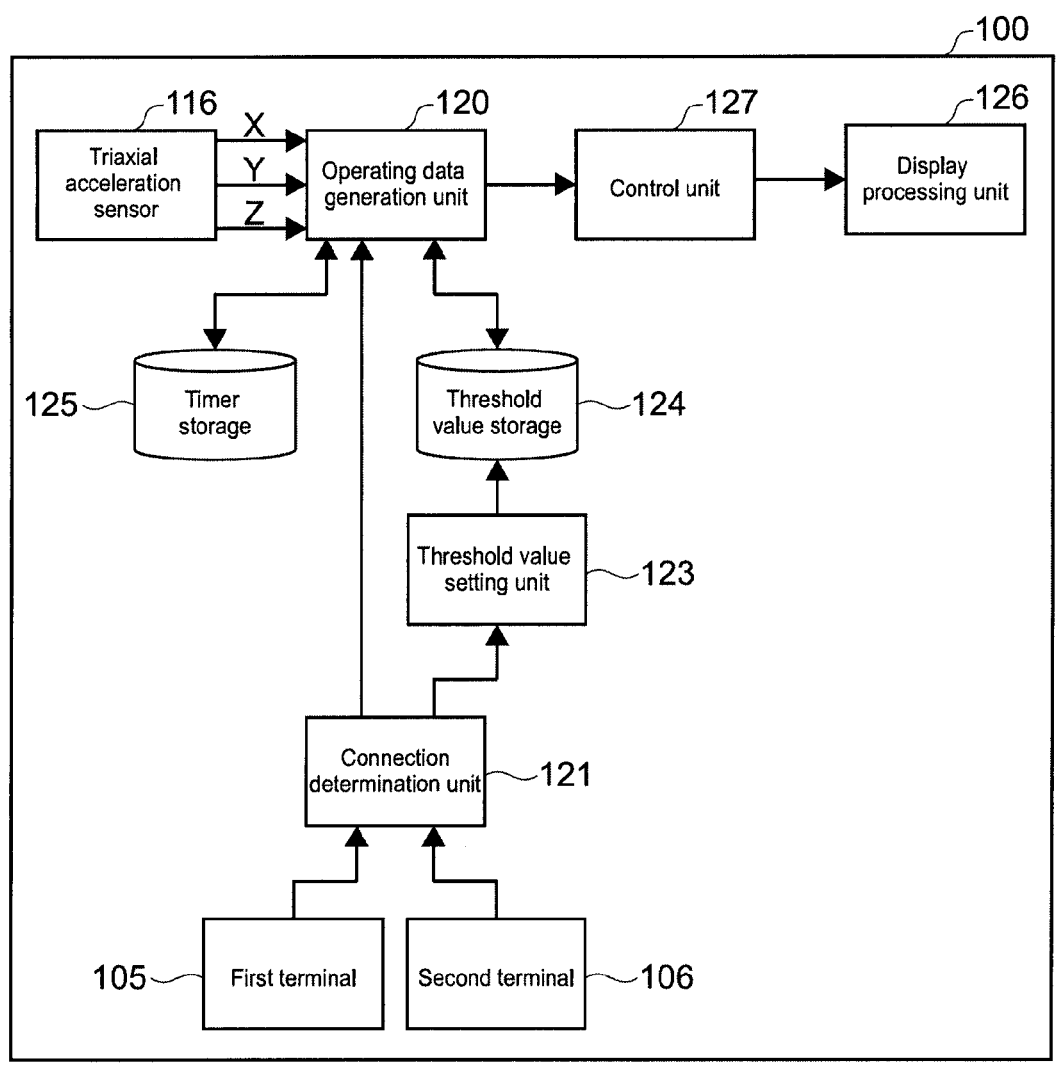
FIG. 4 is a block diagram showing a functional configuration of the portable electronic apparatus.

FIG. 4 is a block diagram showing a functional configuration of the portable electronic apparatus 100.

The portable electronic apparatus 100 includes the triaxial acceleration sensor 116, an operating data generation unit 120 (gesture recognition unit), a connection determination unit 121, a threshold value setting unit 123, threshold value storage 124, timer storage 125, a display processing unit 126 (display control unit), and a control unit 127 (processing execution unit). Each of the functional units is attained by a computer resource based on a program loaded into the work memory 113. Each of the storages is set to the flash ROM 119 or the like which is a non-volatile memory which can be rewritten.

The connection determination unit 121 determines a change in connection states of the first terminal 105 and the second terminal 106 of the external apparatus. Specifically, the connection determination unit 121 determines a change in electrical connection state of the external apparatus with respect to the first terminal 105 and the second terminal 106, respectively, based on signals output from the first terminal 105 and the second terminal 106. The change in connection state means that the terminal of the external apparatus has been connected to the first terminal 105 or the second terminal 106 to which the terminal of the external apparatus is not yet connected. Alternatively, the change in connection state means that the terminal of the external apparatus has become unconnected to the first terminal 105 or the second terminal 106 to which the terminal of the external apparatus is connected. When determining the change in connection state, the connection determination unit 121 supplies the change in connection state to the threshold value setting unit 123 and the operating data generation unit 120 as the determination result.

When acquiring the determination result of the change in connection state from the connection determination unit 121, the threshold value setting unit 123 changes a threshold value as an acceleration determining condition. That is, the threshold value setting unit 123 changes, in accordance with the connection states of the first terminal 105 and the second terminal 106, threshold values which are set with respect to respective accelerations in the triaxial directions of XYZ, the number of inversions of acceleration in the X-axis direction (the number of shakes), and an inversion cycle of acceleration in the X-axis direction (time period of shaking), as the acceleration determining condition. Specifically, in the threshold value storage 124, threshold values Xt, Yt, and Zt of respective accelerations in the triaxial directions of XYZ, a threshold value Xnt of the number of inversions of acceleration in the X-axis direction, and a threshold value Xrt of the inversion cycle of acceleration in the X-axis direction are stored in advance as the acceleration determining condition. The threshold value setting unit 123 refers to a flag showing the connection states of the first terminal 105 and the second terminal 106 as the determination result acquired from the connection determination unit 121. The threshold value setting unit 123 rewrites, based on the flag, the threshold values Xt, Yt, and Zt of respective accelerations in the triaxial directions of XYZ, the threshold value Xnt of the number of inversions of acceleration in the X-axis direction, and the threshold value Xrt of the inversion cycle of acceleration in the X-axis direction, which are stored in the threshold value storage 124 as the acceleration determining condition (rewritten threshold values of accelerations=Xt',Yt',Zt', rewritten threshold value of the number of inversions of acceleration in X-axis direction=Xnt', rewritten threshold value of inversion cycle of acceleration in X-axis direction=Xrt'). It should be noted that how a threshold value is set in what connection state will be described later.

The operating data generation unit 120 A/D-converts and takes in three signals corresponding to the respective accelerations in the triaxial directions output from the triaxial acceleration sensor 116, and then obtains acceleration values Xo, Yo, and Zo in the triaxial directions of XYZ. Moreover, the operating data generation unit 120 calculates the number Xn of inversions of acceleration in the X-axis direction and an inversion cycle Xr of acceleration in the X-axis direction, based on the acceleration value Xo in the X-axis direction. The operating data generation unit 120 refers to the threshold values Xt', Yt', and Zt' of respective accelerations in the triaxial directions of XYZ, the threshold value Xnt' of the number of inversions of acceleration in the X-axis direction, and the threshold value Xrt' of the inversion cycle of acceleration in the X-axis direction, which are stored in the threshold value storage 124. The operating data generation unit 120 subtracts the threshold values Xt', Yt', and Zt' of respective accelerations in the triaxial directions of XYZ from the acceleration values Xo, Yo, and Zo in the triaxial directions of XYZ and thus obtains detection effective values Xe, Ye, and Ze ($\geq 0$) of respective accelerations in the triaxial directions of XYZ. The operating data generation unit 120 calculates a resultant acceleration $Xe^2+Ye^2+Ze^2$ based on the detection effective values Xe, Ye, and Ze of respective accelerations in the triaxial directions of XYZ. Further, the operating data generation unit 120 subtracts the threshold values Xnt' and Xrt' from the number Xn of inversions of acceleration in the X-axis direction and the inversion cycle Xr of acceleration in the X-axis direction, respectively, and thus obtains a detection effective value Xne ($\geq 0$) of the number of inversions of acceleration in the X-axis direction and a detection effective value Xre ($\geq 0$) of the inversion cycle of acceleration in the X-axis direction. The operating data generation unit 120 obtains one operating data (operation gesture) based on the resultant acceleration $Xe^2+Ye^2+Ze^2$, the detection effective value Xne of the number of inversions of acceleration in the X-axis direction, and the detection effective value Xre of the inversion cycle of acceleration in the X-axis direction, and then supplies the operating data to the control unit 127.

Further, when acquiring the determination result of the change in connection state from the connection determination unit 121, the operating data generation unit 120 sets a timer so that the operating data is not generated in accordance with the output of the triaxial acceleration sensor 116 for a predetermined period of time corresponding to a timing at which the connection determination unit 121 has determined the change in connection state, and then stores it in the timer storage 125. The processing is performed for the following purpose. That is, if a shake caused when the user attaches/removes the terminal of the external apparatus to/from the first terminal 105 or the second terminal 106 is detected as a shaking operation, processing corresponding to the shaking operation may be performed at a user's unintended timing. Therefore, by considering the output from the triaxial acceleration sensor 116 invalid for a predetermined time period right after the terminal of the external apparatus is attached/removed, it is possible to prevent processing corresponding to the shaking operation from being performed at a user's unintended timing along with the shake when attaching/removing the terminal.

It should be noted that, in this embodiment, although the operating data generation unit 120 does not generate operating data right after the terminal of the external apparatus is attached/removed, it is also possible for the operating data generation unit 120 to generate the operating data and allow the control unit 127 to ignore the control data. Alternatively, it is also possible to interrupt the control data during transmission from the operating data generation unit 120 to the control unit 127.

The control unit 127 determines the content of the operation performed by the user based on the acquired operating data and executes processing in accordance with the content of the operation. The operating data generation unit 120 performs processing for linearly changing an object on a screen like moving or enlarging/contracting the object only by a distance corresponding to the acceleration of the shaking operation, for example. Further, as described above, the operating data generation unit 120 does not generate the operating data for a predetermined period of time, and thus the control unit 127 also does not perform processing for a predetermined period of time corresponding to a timing at which the connection determination unit 121 has determined the change in connection state.

The display processing unit 126 generates display data for outputting data which has been processed by the control unit 127 to the display panel 103 and displays it on the display panel 103.

[Operation of Portable Electronic Apparatus]

Next, an operation of the portable electronic apparatus 100 will be described. The description of the operation will be made in the following order.
1. Detection Processing of Terminal State
2. Main Processing In the "Detection Processing of Terminal State", the change in connection state of the external apparatus to the first terminal 105 and the second terminal 106 is detected, and the threshold value is set in accordance with the detection information. In the "Main Processing", processing corresponding to the detection information on the acceleration detected by the triaxial acceleration sensor 116 is performed.

[1. Detection Processing of Terminal State]

FIG. 5 is a flowchart showing detection processing of a terminal state.

The connection determination unit 121 determines a change in electrical connection state of the terminal of the external apparatus to the first terminal 105 and the second terminal 106 based on a signal output from the first terminal 105 and the second terminal 106 (S101). The connection determination unit 121 notifies the operating data generation unit 120 and the threshold value setting unit 123 of the change in connection states of the first terminal 105 and the second terminal 106 as a determination result.

When acquiring the determination result of the change in connection state from the connection determination unit 121, the operating data generation unit 120 does not generate the operating data for a predetermined period of time corresponding to a timing at which the connection determination unit 121 has determined the change in connection state (S102).

On the other hand, when acquiring the determination result of the change in connection state from the connection determination unit 121, the threshold value control unit 123 changes the threshold value as the acceleration determination condition. Specifically, the threshold value setting unit 123 refers to a flag which shows the connection states of the first terminal 105 and the second terminal 106 as the determination result acquired from the connection determination unit 121. The threshold value setting unit 123 rewrites, based on the flag, the threshold values Xt, Yt, and Zt of respective accelerations in the triaxial directions of XYZ, the threshold value Xnt of the number of inversions of acceleration in the X-axis direction, and the threshold value Xrt of the inversion cycle of acceleration in the X-axis direction, which are stored in the threshold value storage 124 as the acceleration determining condition (rewritten threshold values of accelerations=Xt',Yt',Zt', rewritten threshold value of the number of inversions of acceleration in X-axis direction=Xnt', rewritten threshold value of the inversion cycle of acceleration in X-axis direction=Xrt') (S103).

[Setting of Acceleration Determination Condition]

Here, how the threshold value control unit 123 sets the threshold values as the acceleration determination condition in S103 will be described. That is, how the threshold value control unit 123 sets the respective threshold values to be high or low in what connection states of the first terminal 105 and the second terminal 106 will be described in more detail. The description will be made in the following order.
(1) In a case where the first terminal 105 is in an unconnected state and the second terminal 106 is in an unconnected state
(2) In a case where the first terminal 105 is in a connected state and the second terminal 106 is in an unconnected state
(3) In a case where the first terminal 105 is in an unconnected state and the second terminal 106 is in a connected state
(4) In a case where the first terminal 105 is in a connected state and the second terminal 106 is in a connected state FIG. 6 is a table showing an example of the respective threshold values that have been changed in accordance with the connection states of the first terminal and the second terminal.

[(1) In a case where the first terminal 105 is in an unconnected state and the second terminal 106 is in an unconnected state]

In a case where the first terminal 105 is in an unconnected state and the second terminal 106 is in an unconnected state, threshold values Xt, Yt, and Zt of respective accelerations in the triaxial directions of XYZ are set to 100, the threshold value Xnt of the number of inversions of acceleration in the X-axis direction is set to 2, and the threshold value Xrt of the inversion cycle of acceleration in the X-axis direction is set to 400. These values are default values of the respective threshold values.

In the following, when the respective threshold values in the case of (1), i.e., in a case where the first terminal 105 is in an unconnected state and the second terminal 106 is in an unconnected state are assumed to be defaults, how the respective threshold values in the connection states of (2) to (4) are set differently from those of (1) will be described sequentially.

[(2) In a case where the first terminal 105 is in a connected state and the second terminal 106 is in an unconnected state]

In a case where the first terminal 105 is in a connected state and the second terminal 106 is in an unconnected state, the threshold values are set as follows.

(a) Set the threshold value of acceleration in the X-axis direction to be lower than the threshold value in the connection state of (1)

(b) Set the threshold value of the number of inversions of acceleration in the X-axis direction to be lower than the threshold value in the connection state of (1)

(c) Set the threshold value of the inversion cycle of acceleration in the X-axis direction to be higher than the threshold value in the connection state of (1)

In the following, the reason why the threshold values are set as above-mentioned (a), (b), and (c) in the case where the first terminal 105 is in the unconnected state and the second terminal 106 is in the connected state will be described.

The description about (a) will be made.

Figure 7:
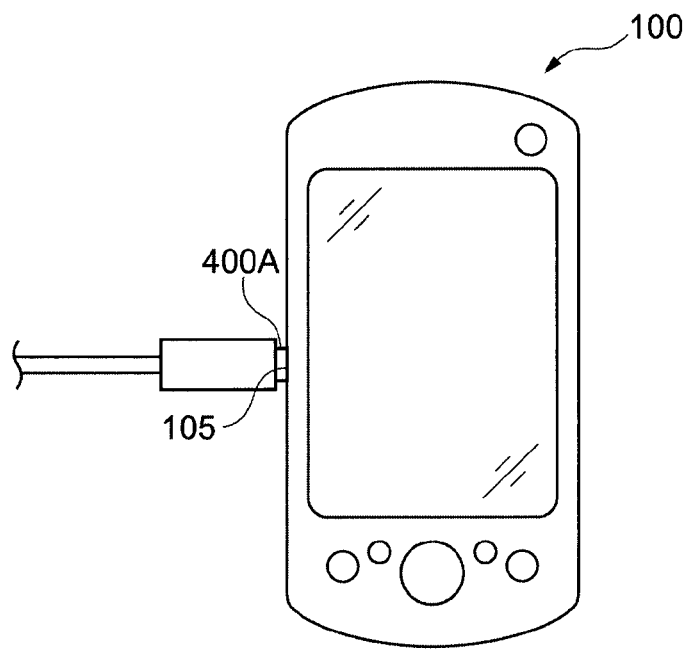
FIG. 7 is a diagram showing a connection state of an external apparatus with respect to the first terminal.

As shown in FIG. 7, since a terminal 400A of the external apparatus is inserted into the first terminal 105 in the X-axis direction, there is a risk that the terminal of the external apparatus may come out due to a shaking operation in the X-axis direction, the weight of an object to be held may become large, or it may be difficult to perform the shaking operation due to the external apparatus. It thus becomes difficult for the user to perform the shaking operation quickly in the X-axis direction.

Therefore, the threshold value Xt' of acceleration in the X-axis direction is set to be lower than the threshold value Xt (Xt=100) of acceleration in the X-axis direction in the connection state of (1), i.e., in a case where the first terminal 105 is in the unconnected state (Xt'=80).

It is possible to obtain the detection effective value Xe of acceleration in the X-axis direction of a desired magnitude by setting the threshold value Xt' of acceleration in the X-axis direction to be relatively low and thus increasing the sensitivity, even if the user performs the shaking operation relatively slowly.

The description about (b) will be made.

Since the terminal of the external apparatus is inserted into the first terminal 105 in the X-axis direction, there is a risk that the terminal of the external apparatus may come out due to a shaking operation in the X-axis direction, the weight of an object to be held may become large, or it may be difficult to perform the shaking operation due to the external apparatus. Thus, there is a possibility that the user will not perform the shaking operation in the X-axis direction many times.

Therefore, the threshold value Xnt' of the number of inversions of acceleration in the X-axis direction is set to be lower than the threshold value Xnt (Xnt=2) of the number of inversions of acceleration in the X-axis direction in the connection state of (1), i.e., in a case where the first terminal 105 is in the unconnected state (Xnt'=1).

It is possible to obtain the detection effective value Xne of the number of inversions of acceleration in the X-axis direction of a desired magnitude by setting the threshold value Xnt' of the number of inversions of acceleration in the X-axis direction to be relatively low and thus increasing the sensitivity, even if the user performs the shaking operation in the X-axis direction only a few times.

The description about (c) will be made.

Since the terminal of the external apparatus is inserted into the first terminal 105 in the X-axis direction, there is a risk that the terminal of the external apparatus may come out due to a shaking operation in the X-axis direction, the weight of an object to be held may become large, or it may be difficult to perform the shaking operation due to the external apparatus. It thus becomes difficult for the user to perform the shaking operation quickly in the X-axis direction.

Therefore, the threshold value Xrt' of the inversion cycle of acceleration in the X-axis direction is set to be lower than the threshold value Xrt (Xrt=400) of the inversion cycle of acceleration in the X-axis direction in the connection state of (1), i.e., in a case where the first terminal 105 is in the unconnected state (Xrt'=800).

It is possible to obtain the detection effective value Xre of the inversion cycle of acceleration in the X-axis direction of a desired magnitude by setting the threshold value Xrt' of the inversion cycle of acceleration in the X-axis direction to be relatively high and thus increasing the sensitivity, even if the user performs the shaking operation relatively slowly.

[(3) In a case where the first terminal 105 is in an unconnected state and the second terminal 106 is in a connected state]

In a case where the first terminal 105 is in an unconnected state and the second terminal 106 is in a connected state, the threshold values are set as follows.

(d) Set the threshold value of acceleration in the Y-axis direction to be lower than the threshold value in the connection state of (1)

(e) Set the threshold value of the inversion cycle of acceleration in the X-axis direction to be higher than the threshold value in the connection state of (1) and lower than the threshold value in the connection state of (2)

In the following, the reason why the threshold values are set as above-mentioned (d) and (e) in the case where the first terminal 105 is in the unconnected state and the second terminal 106 is in the connected state will be described.

The description about (d) will be made.

Figure 8:
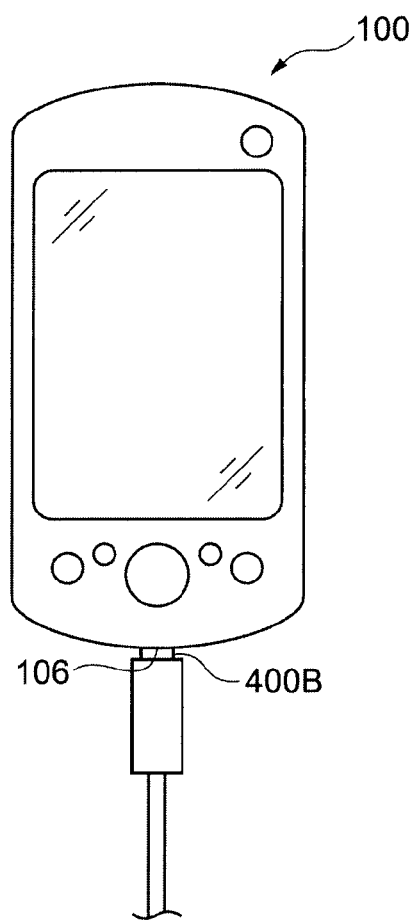
FIG. 8 is a diagram showing a connection state of an external apparatus with respect to the second terminal.

As shown in FIG. 8, since a terminal 400B of the external apparatus is inserted into the second terminal 106 in the Y-axis direction, there is a risk that the terminal of the external apparatus may come out due to a shaking operation in the Y-axis direction, the weight of an object to be held may become large, or it may be difficult to perform the shaking operation due to the external apparatus. It thus becomes difficult for the user to perform the shaking operation quickly in the Y-axis direction.

Therefore, the threshold value Yt' of acceleration in the Y-axis direction is set to be lower than the threshold value Yt (Yt=100) of acceleration in the Y-axis direction in the connection state of (1), i.e., in a case where the second terminal 106 is in the unconnected state (Yt'=70).

It is possible to obtain the detection effective value Ye of acceleration in the Y-axis direction of a desired magnitude by setting the threshold value Yt' of acceleration in the Y-axis direction to be relatively low and thus increasing the sensitivity, even if the user performs the shaking operation relatively slowly.

The description about (e) will be made.

Since the terminal of the external apparatus is inserted into the second terminal 106, there is a risk that the terminal of the external apparatus may come out due to a shaking operation, the weight of an object to be held may become large, or it may be difficult to perform the shaking operation due to the external apparatus. It thus becomes difficult for the user to perform the shaking operation quickly. Therefore, the threshold value Xrt' of the inversion cycle of acceleration in the X-axis direction is set to be higher than the threshold value Xrt (Xrt=400) of the inversion cycle of acceleration in the X-axis direction in the connection state of (1), i.e., in a case where both the first terminal 105 and the second terminal 106 are in the unconnected state (Xrt'=500).

On the other hand, since the terminal of the external apparatus is not inserted into the first terminal 105, the terminal of the external apparatus will not come out from the first terminal 105 even if the portable electronic apparatus 100 is shaken in the X-axis direction. Therefore, it can be considered that the user can perform the shaking operation more quickly than in the connection state of (2), i.e., the first terminal 105 is in the connected state. Therefore, the threshold value Xrt' of the inversion cycle of acceleration in the X-axis direction is set to be lower than the threshold value Xrt' (Xrt'=800) of the inversion cycle of acceleration in the X-axis direction in the connection state of (2), i.e., in a case where the first terminal 105 is in the connected state (Xrt'=500).

It is possible to obtain the detection effective value Xre of the inversion cycle of acceleration in the X-axis direction of a desired magnitude by setting the threshold value Xrt' of the inversion cycle of acceleration in the X-axis direction to be higher than the threshold value Xrt in the connection state of (1) and thus increasing the sensitivity, even if the user performs the shaking operation relatively slowly.

[(4) In a case where the first terminal 105 is in a connected state and the second terminal 106 is in a connected state]

In a case where the first terminal 105 is in a connected state and the second terminal 106 is in a connected state, the threshold values are set as follows.

(f) Set the threshold values of respective accelerations in the triaxial directions of XYZ to be lower than the threshold values in the connection states of (1), (2), and (3)

(g) Set the threshold value of the number of inversions of acceleration in the X-axis direction to be lower than the threshold value in the connection state of (1)

(h) Set the threshold value of the inversion cycle of acceleration in the X-axis direction to be higher than the threshold values in the connection states of (1), (2), and (3)

In the following, the reason why the threshold values are set as above-mentioned (f), (g), and (h) in the case where the first terminal 105 is in the connected state and the second terminal 106 is in the connected state will be described.

The description about (f) will be made.

When the external apparatus is connected to the first terminal 105 and the second terminal 106, the weight of an object to be held may become large, it may be difficult to perform the shaking operation due to the external apparatus, or there is a risk that the terminal of the external apparatus may come out. It thus becomes difficult for the user to perform the shaking operation quickly.

Therefore, threshold values of respective accelerations in the triaxial directions of XYZ are set to be lower than the threshold values Xt, Yt, and Zt of respective accelerations in the triaxial directions of XYZ in the connection states of (1), (2), and (3), i.e., in a case where the terminal of the external apparatus is in the unconnected state, or only one terminal of the external apparatus is in the connected state. Specifically, the threshold value Xt' of acceleration in the X-axis direction is set to be lower than the threshold values Xt (Xt=100 or 80) of acceleration in the X-axis direction in the connection states of (1), (2), and (3) (Xt'=60). Moreover, the threshold value Yt' of acceleration in the Y-axis direction is set to be lower than the threshold value Yt (Yt=100) of acceleration in the Y-axis direction in the connection states of (1) and (2) (Yt'=70). Moreover, the threshold value Zt' of acceleration in the Z-axis direction is set to be lower than the threshold value Zt (Zt=100) of acceleration in the Z-axis direction in the connection states of (1) and (2) (Zt'=80).

It is possible to obtain the detection effective values Xe, Ye, and Ze of respective accelerations in the triaxial directions of XYZ of a desired magnitude by setting the threshold values Xt, Yt, and Zt of respective accelerations in the triaxial directions of XYZ to be lower than the threshold values in the connection states of (1), (2), and (3), i.e., in a case where the terminal of the external apparatus is in the unconnected state, or only one terminal of the external apparatus is in the connected state and thus increasing the sensitivity, even if the user performs the shaking operation relatively slowly.

The description about (g) will be made.

When the external apparatus is connected to the first terminal 105 and the second terminal 106, the weight of an object to be held may become large, it may be difficult to perform the shaking operation due to the external apparatus, or there is a risk that the terminal of the external apparatus may come out. Thus, there is a possibility that the user will not perform the shaking operation many times. Especially since the terminal of the external apparatus is inserted into the first terminal 105 in the X-axis direction, there is a risk that the terminal of the external apparatus may come out due to a shaking operation in the X-axis direction. Thus, there is a possibility that the user will not perform the shaking operation in the X-axis direction many times.

Therefore, the threshold value Xnt' of the number of inversions of acceleration in the X-axis direction is set to be lower than the threshold value Xnt (Xnt=2) of the number of inversions of acceleration in the X-axis direction in the connection state of (1), i.e., in the case where the first terminal 105 is in the unconnected state (Xnt'=1).

It is possible to obtain the detection effective value Xne of the number of inversions of acceleration in the X-axis direction of a desired magnitude by setting the threshold value Xnt' of the number of inversions of acceleration in the X-axis direction to be relatively low and thus increasing the sensitivity, even if the user performs the shaking operation in the X-axis direction only a few times.

The description about (h) will be made.

When the external apparatus is connected to the first terminal 105 and the second terminal 106, the weight of an object to be held may become large, it may be difficult to perform the shaking operation due to the external apparatus, or there is a risk that the terminal of the external apparatus may come out. It thus becomes difficult for the user to perform the shaking operation quickly.

Therefore, the threshold value Xrt' of the inversion cycle of acceleration in the X-axis direction is set to be higher than the threshold value Xrt (Xrt=400, 800, or 500) of the inversion cycle of acceleration in the X-axis direction in the connection states of (1), (2), and (3), i.e., in the case where the terminal of the external apparatus is in the unconnected state, or only one terminal of the external apparatus is in the connected state (Xrt'=1000).

The operating data generation unit 120 can obtain the detection effective value Xre of the inversion cycle of acceleration in the X-axis direction of a desired magnitude by setting the threshold value of the inversion cycle of acceleration in the X-axis direction to be relatively high and thus increasing the sensitivity, even if the user performs the shaking operation relatively slowly.

[2. Main Processing]

Next, main processing will be described.

Figure 9:
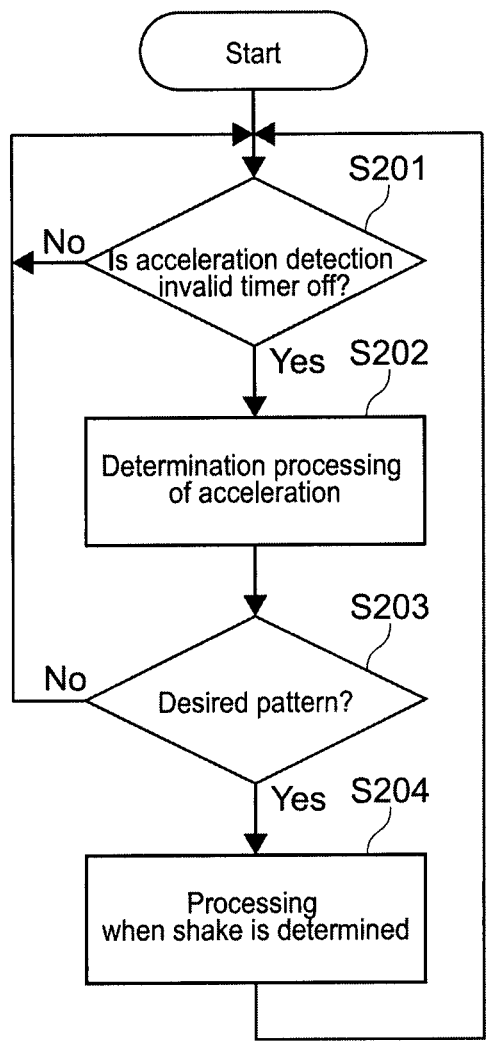
FIG. 9 is a flowchart showing main processing.

FIG. 9 is a flowchart showing the main processing.

The operating data generation unit 120 A/D-converts and takes in three signals corresponding to the respective accelerations in the triaxial directions output from the triaxial acceleration sensor 116, and then obtains acceleration values Xo, Yo, and Zo in the triaxial directions of XYZ. Moreover, the operating data generation unit 120 calculates the number Xn of inversions of acceleration in the X-axis direction and an inversion cycle Xr of acceleration in the X-axis direction, based on the acceleration value Xo in the X-axis direction. When the determination result of the change in connection state is not acquired from the connection determination unit 121 (Yes in S201), the operating data generation unit 120 refers to the threshold values Xt', Yt', and Zt' of respective accelerations in the triaxial directions of XYZ, the threshold value Xnt' of the number of inversions of acceleration in the X-axis direction, and the threshold value Xrt' of the inversion cycle of acceleration in the x-axis direction, which are stored in the threshold value storage 124. The operating data generation unit 120 subtracts the threshold values Xt', Yt', and Zt' of respective accelerations in the triaxial directions of XYZ from the acceleration values Xo, Yo, and Zo in the triaxial directions of XYZ and thus obtains detection effective values Xe, Ye, and Ze (in) of respective accelerations in the triaxial directions of XYZ. The operating data generation unit 120 calculates a resultant acceleration $Xe^2+Ye^2+Ze^2$ based on the detection effective values Xe, Ye, and Ze of respective accelerations in the triaxial directions of XYZ. Further, the operating data generation unit 120 subtracts the threshold values Xnt' and Xrt' from the number Xn of inversions of acceleration in the X-axis direction and the inversion cycle Xr of acceleration in the x-axis direction, respectively, and thus obtains a detection effective value Xne (in) of the number of inversions of acceleration in the X-axis direction and a detection effective value Xre (in) of the inversion cycle of acceleration in the x-axis direction. The operating data generation unit 120 obtains one operating data (operation gesture) based on the resultant acceleration $Xe^2+Ye^2+Ze^2$, the detection effective value Xne of the number of inversions of acceleration in the X-axis direction, and the detection effective value Xre of the inversion cycle of acceleration in the X-axis direction, and then supplies the operating data to the control unit 127 (S202). The control unit 127 determines the content of the operation performed by the user based on the acquired operating data (S203) and executes processing in accordance with the content of the operation (S204).

According to this embodiment, the threshold value setting unit 123 changes the thresholds value set for the acceleration, the number of inversions of acceleration, and the inversion cycle of acceleration, in accordance with connection states of the terminal of the external apparatus to the first terminal 105 and the second terminal 106, and thus increases sensitivity. Accordingly, it is possible to obtain the detection effective value in a desired magnitude, even if it is difficult to perform the shaking operation due to an interference of the external apparatus.

Furthermore, according to this embodiment, when acquiring the determination result of the change in connection state from the connection determination unit 121, the operating data generation unit 120 does not generate the operating data for a predetermined period of time corresponding to a timing at which the connection determination unit 121 has determined the change in connection state. Accordingly, it is possible to prevent the processing corresponding to the shaking operation from being performed at the user's unintended timing along with the shake when attaching/removing the terminal.

Second Embodiment

In the first embodiment, by lowering the threshold value of acceleration in the triaxial directions or the like, in accordance with the connection states of the first terminal 105 and the second terminal 106, and thus increasing the sensitivity, it is possible to obtain the detection effective value in a desired magnitude, even if it is difficult to perform the shaking operation due to an interference of the external apparatus. In contrast, in the second embodiment, by increasing a threshold value of acceleration in an axial direction other than the axial direction of the shaking operation which is considered to be mainly performed naturally by the user, in accordance with the connection states of the first terminal 105 and the second terminal 106, it is possible to prevent the shaking operation from being detected by mistake. In other words, in order to prevent the shake of the key operation or the like from being determined as the shaking operation so that the processing corresponding to the operation content is prevented from being performed despite the intention of the user, by increasing a threshold value of acceleration in an axial direction other than the axial direction of the shaking operation which is considered to be mainly performed naturally by the user, it becomes difficult to detect the shake in the axial direction other than the axial direction of the shaking operation which is considered to be mainly performed naturally by the user. In the following, the description about the same configuration or the like as the first embodiment is omitted by attaching the same reference symbols as those of the first embodiment, and different points will be described mainly.

[Functional Configuration of Information Processing Apparatus]

Figure 10:
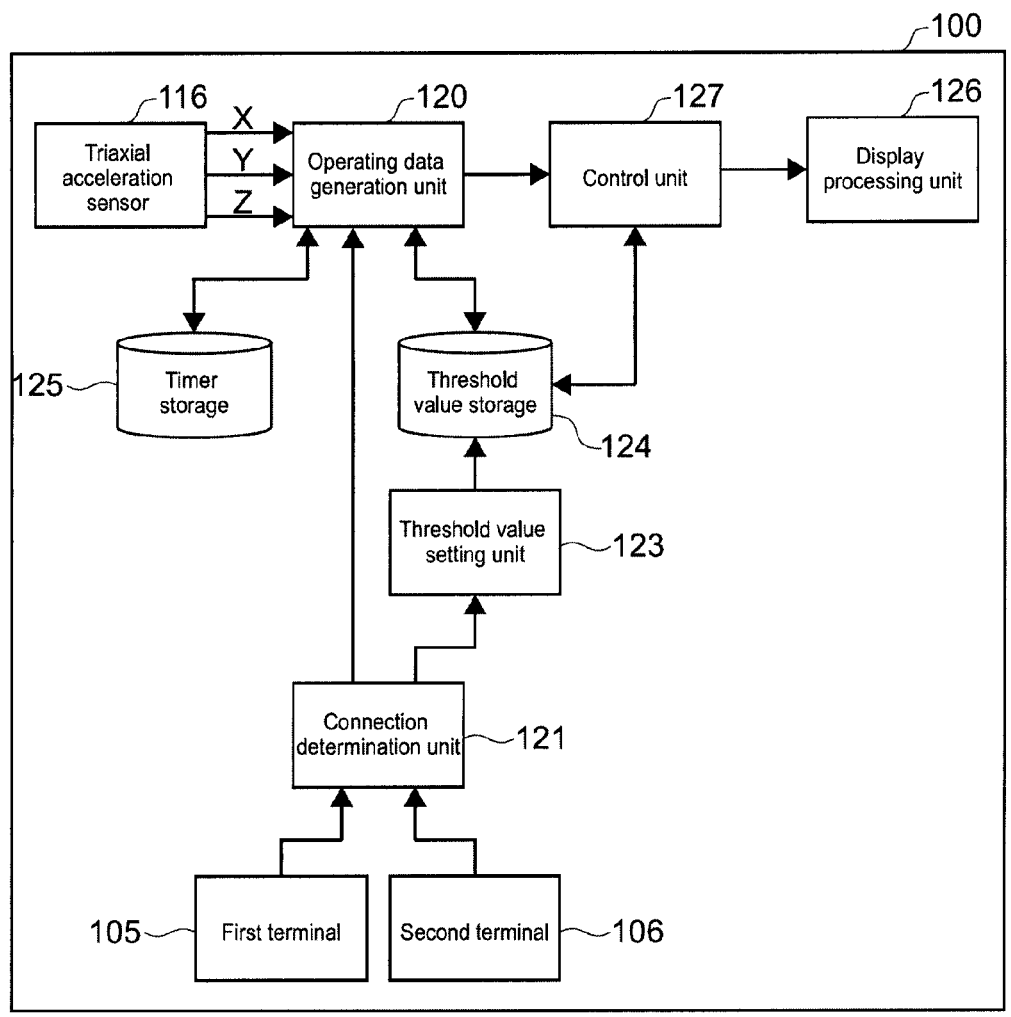
FIG. 10 is a block diagram showing a functional configuration of a portable electronic apparatus according to a second embodiment of the present disclosure.

FIG. 10 is a block diagram showing a functional configuration of a portable electronic apparatus according to a second embodiment of the present disclosure.

The threshold value control unit 123 sets, in accordance with the connection states of the first terminal 105 and the second terminal 106, the threshold values of respective accelerations in the triaxial directions of XYZ as the acceleration determining condition. Here, how the threshold values are set to be high or low in what connection states of the first terminal 105 and the second terminal 106 will be described in detail. The description will be made in the following order.

(1) In a case where the first terminal 105 is in an unconnected state and the second terminal is in a connected state
(2) In a case where the first terminal 105 is in a connected state and the second terminal is in an unconnected state

[(1) In a case where the first terminal 105 is in an unconnected state and the second terminal is in a connected state]

The second terminal 106 is provided on the lower side surface 108 (surface including X-axis and Y-axis) of the portable electronic apparatus 100 (FIG. 1). When the external apparatus is connected to the second terminal 106, the user tends to vertically hold the center portion of the portable electronic apparatus 100 in the Y-axis direction. When performing the shaking operation while holding the portable electronic apparatus 100 as described above, the user tends to flex the wrist in the horizontal direction (X-axis direction) to perform the shaking operation. In this case, the direction of the shaking operation is mainly the X-axis direction. That is, in a case where the first terminal 105 is in an unconnected state and the second terminal is in a connected state, it is considered that the user mainly and naturally performs the shaking operation in the X-axis direction.

In this case, the threshold value control unit 123 increases the threshold values of accelerations in the Y-axis direction and the Z-axis direction. The reason for this is as follows. If the threshold values of accelerations in the triaxial directions of XYZ remain low, when the acceleration due to the shake of the key operation or the like is detected, the detection effective value of accelerations in the triaxial directions of XYZ becomes high, and thus the value of resultant acceleration also becomes high. As a result, processing corresponding to the operation content is performed despite the intention of the user. In contrast, by setting the threshold values of accelerations in the Y-axis direction and the Z-axis direction high, even if the acceleration due to the shake of the key operation or the like is detected, the detection effective value of the accelerations in the Y-axis direction and the Z-axis direction becomes zero or takes a small value, and thus it is possible to maintain the value of the resultant acceleration low. As a result, it is possible to prevent the shaking operation from being detected by mistake so that the processing corresponding to the operation content is prevented from being performed despite the intention of the user. On the other hand, in a case where the user performs the shaking operation voluntarily, even if the detection effective value of the accelerations in the Y-axis direction and Z-axis direction becomes zero or takes a small value, by increasing the threshold values of accelerations in the Y-axis direction and the Z-axis direction, it is possible to obtain desired resultant acceleration when the detection effective value of the acceleration in the X-axis direction is sufficiently high, because the direction is mainly the X-axis direction.

[(2) In a case where the first terminal 105 is in a connected state and the second terminal is in an unconnected state]

The first terminal 105 is provided on the lateral surface (including Y-axis and Z-axis) 107 of the portable electronic apparatus 100 (FIG. 1). When the external apparatus is connected to the first terminal 105, the user feels that the terminal of the external apparatus may come out if the user shakes the portable electronic apparatus 100 in the X-axis direction. Thus, the user tends to perform the shaking operation by shaking the portable electronic apparatus 100 mainly in an elevation angle direction (Z-axis direction). That is, in a case where the first terminal 105 is in a connected state and the second terminal is in an unconnected state, it is considered that, mainly, the user naturally performs the shaking operation in the Z-axis direction.

In this case, the threshold value control unit 123 increases the threshold values of accelerations in the X-axis direction and the Y-axis direction for the same reason as described above. That is, by setting the threshold values of accelerations in the X-axis direction and the Y-axis direction high, even if the acceleration due to the shake of the key operation or the like is detected, the detection effective value of the accelerations in the X-axis direction and the Y-axis direction becomes zero or takes a small value, and thus it is possible to maintain the value of the resultant acceleration low. As a result, it is possible to prevent the shaking operation from being detected by mistake so that the processing corresponding to the operation content is prevented from being performed despite the intention of the user. On the other hand, in a case where the user performs the shaking operation voluntarily, even if the detection effective value of the accelerations in the X-axis direction and Y-axis direction becomes zero or takes a small value, by increasing the threshold values of accelerations in the X-axis direction and the Y-axis direction, it is possible to obtain desired resultant acceleration when the detection effective value of the acceleration in the Z-axis direction is sufficiently high, because the direction is mainly the Z-axis direction.

Figure 11:
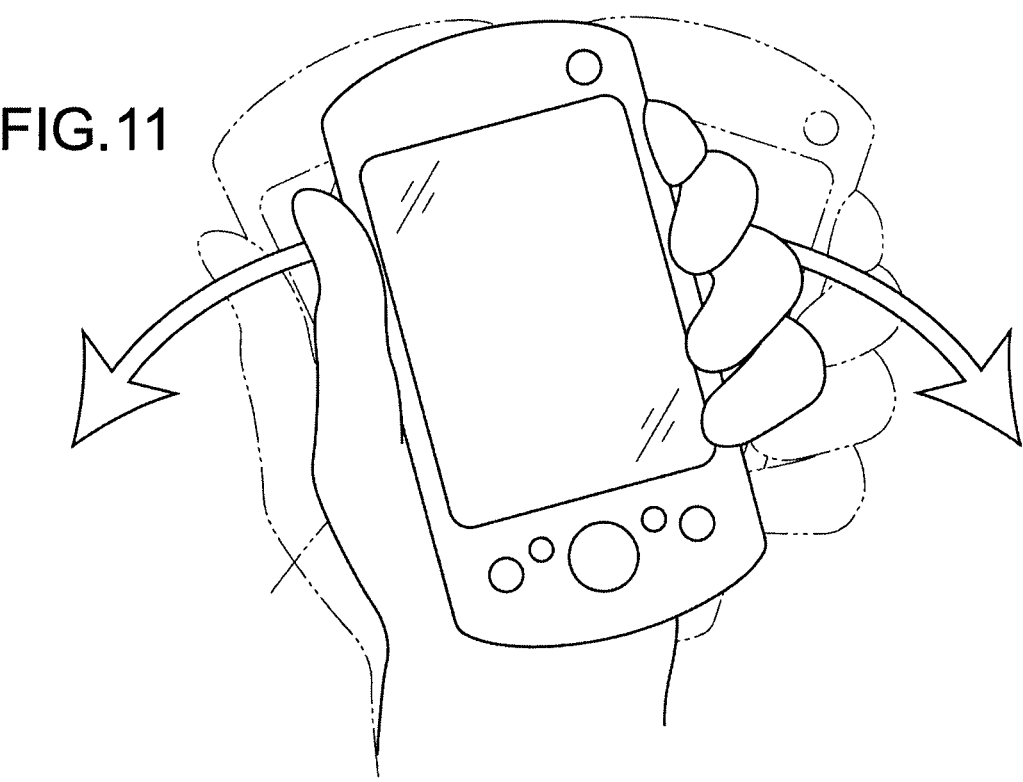
FIG. 11 is a diagram showing an example of an instruction image.
Figure 17:
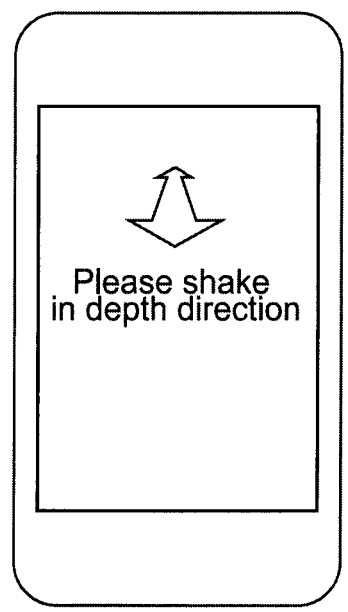
FIG. 17 is a diagram showing a display example of the instruction image.
Figure 18:
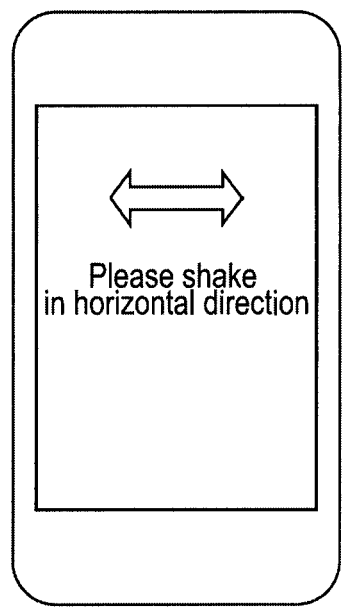
FIG. 18 is a diagram showing another display example of the instruction image.

Referring back to FIG. 10, the control unit 127 refers to the threshold values of respective accelerations in the triaxial directions of XYZ that are stored in the threshold value storage 124. The control unit 127 reads out, for example, from the ROM 112, data of an instruction image corresponding to the combination of the threshold values of accelerations in the triaxial directions of XYZ. The "instruction image" is an image for instructing the user of the direction of the shaking operation. For, example, in a case where the threshold values of accelerations in the Y-axis direction and the Z-axis direction are higher than the threshold value of acceleration in the X-axis direction (setting of (1) described above), the control unit 127 reads out data of an instruction image for instructing the user to perform the shaking operation in the X-axis direction. The "instruction image for instructing the user to perform the shaking operation in the X-axis direction" only needs to be, for example, an image with which the user can recognize the direction of the shaking operation instinctively, as shown in FIG. 11. Moreover, for example, in a case where the threshold values of accelerations in the X-axis direction and the Y-axis direction are higher than the threshold value of acceleration in the Z-axis direction (setting of (2) described above), the control unit 127 reads out data of an instruction image (not shown) for instructing the user to perform the shaking operation in the Z-axis direction. The control unit 127 supplies the data of the instruction image thus read out to the display processing unit 126 and causes the display processing unit 126 to generate data for display which is to be output to the display panel 103. FIG. 17 shows a display example of the instruction image at this time (setting of (2) described above). Moreover, FIG. 18 shows an example of the instruction image for instructing the user to perform the shaking operation in the X-axis direction (setting of (1) described above).

Third Embodiment

Figure 12:
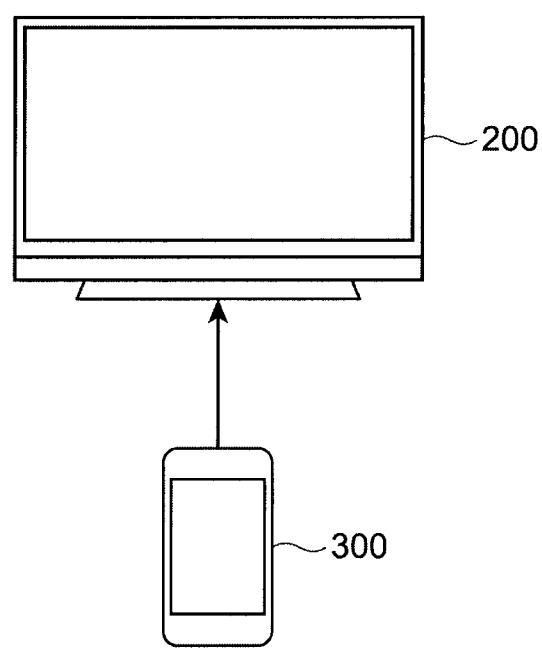
FIG. 12 is a block diagram showing a configuration of an information processing system according to a third embodiment of the present disclosure.

FIG. 12 is a block diagram showing a configuration of an information processing system according to a third embodiment of the present disclosure.

In the first embodiment, the portable electronic apparatus (e.g., a smartphone, a cellular phone, a tablet computer, and a PDA) capable of detecting the change in position of the portable electronic apparatus in space that has been caused due to the shaking operation and performing processing in accordance with the detection information by itself has been described. In contrast, in the third embodiment, an information processing apparatus 200 (information processing apparatus) different from a portable electronic apparatus 300 in which the shaking operation is actually performed detects a change in position of the portable electronic apparatus 300 in space and executes processing in accordance with detection information. Examples of a combination of the information processing apparatus 200 and the portable electronic apparatus 300 include a combination of an operated device such as a television receiver and a personal computer which have a screen and an operating device such as a controller and a game device. In this embodiment, the description will be made with a television receiver being the information processing apparatus 200 and a controller being the portable electronic apparatus 300.

[Hardware Configuration of Portable Electronic Apparatus]

Figure 13:
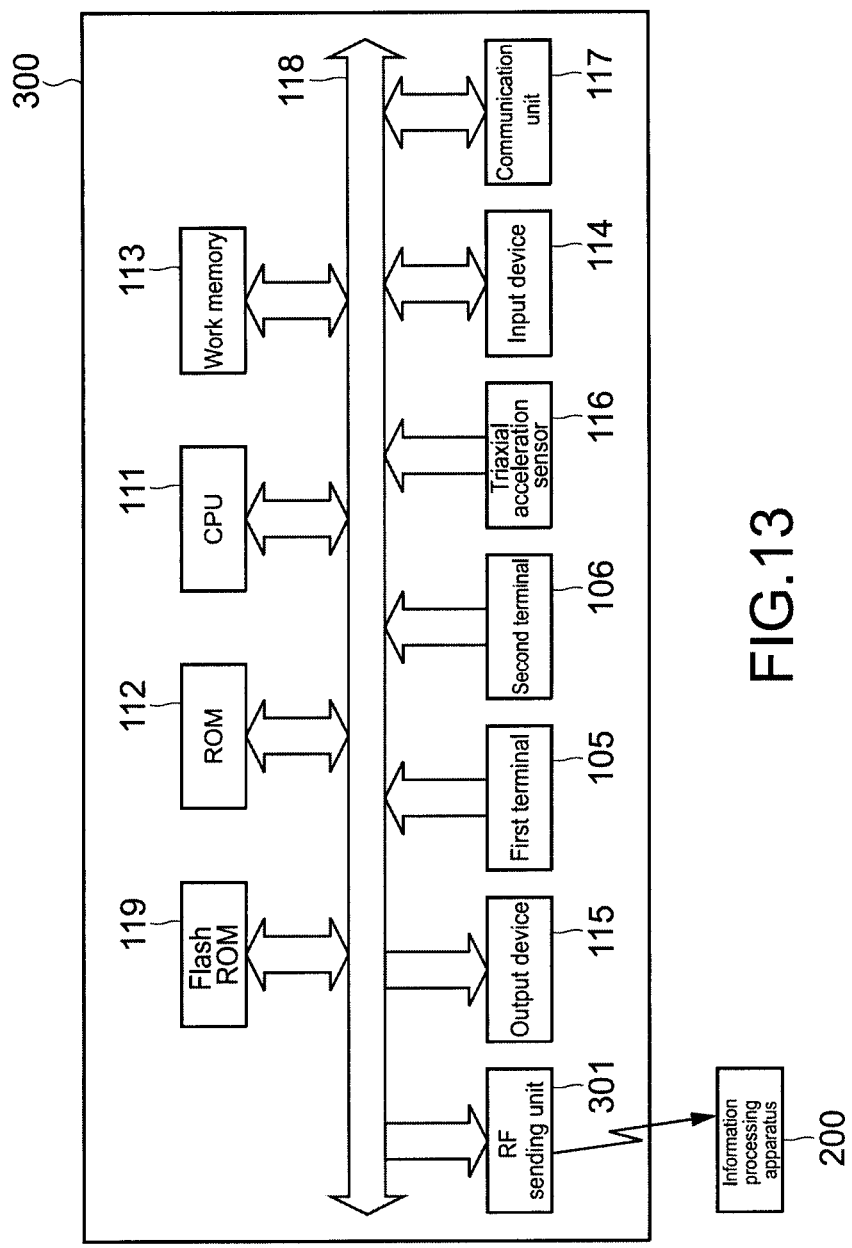
FIG. 13 is a block diagram showing a hardware configuration of the portable electronic apparatus as a controller.

FIG. 13 is a block diagram showing a hardware configuration of the portable electronic apparatus 300 as a controller.

As shown in the figure, the portable electronic apparatus 300 is constituted of a CPU 111, a ROM 112, a work memory 113, a flash ROM 119, an input device 114, an output device 115, a first terminal 105, a second terminal 106, a triaxial acceleration sensor 116, a communication unit 117, a bus 118, an RF sending unit 301, and the like.

The RF sending unit 301 sends a radio frequency (hereinafter referred to as RF) signal in which a command for controlling the information processing apparatus 200 is pulse-modulated.

The functions of the CPU 111, the ROM 112, the work memory 113, the flash ROM 119, the input device 114, the output device 115, the first terminal 105, the second terminal 106, the triaxial acceleration sensor 116, the communication unit 117, and the bus 118, are the same as those of the first embodiment.

[Hardware Configuration of Information Processing Apparatus]

Figure 14:
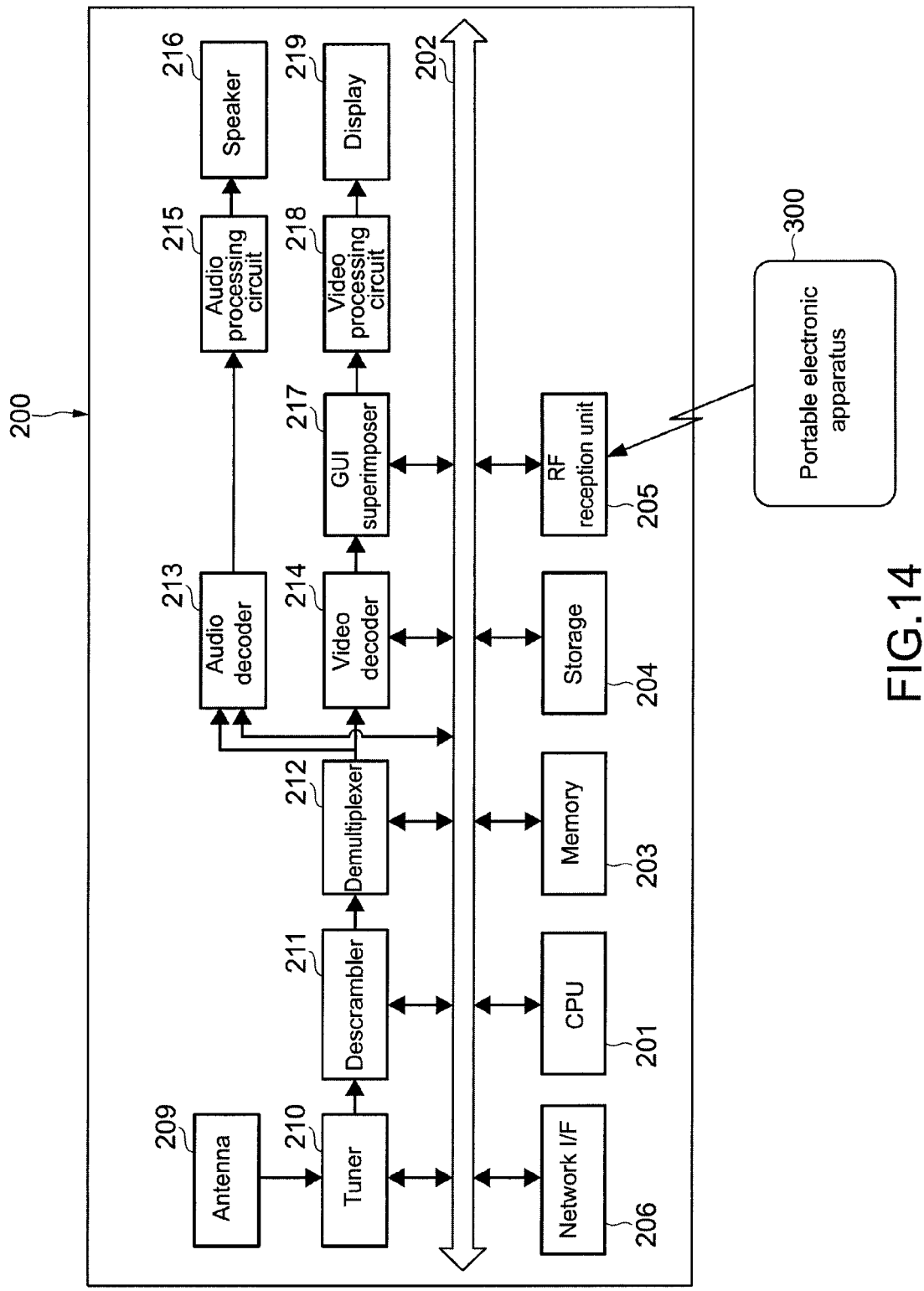
FIG. 14 is a block diagram showing a hardware configuration of an information processing apparatus as a television receiver.

FIG. 14 is a block diagram showing a hardware configuration of the information processing apparatus 200 as a television receiver.

The information processing apparatus 200 includes a CPU 201, a bus 202, a memory 203, storage 204, an RF reception unit 205, and a network I/F 206. The information processing apparatus 200 further includes an antenna 209, a tuner 210, a descrambler 211, a demultiplexer 212, an audio decoder 213, a video decoder 214, an audio processing circuit 215, a speaker 216, a GUI superimposer 217, a video processing circuit 218, and a display 219.

In the information processing apparatus 200, the CPU 201 executes various types of processing in accordance with a program stored in the memory 203 or the storage 204 which is connected therewith via the bus 202. Further, the CPU 201 receives the RF signal output from the portable electronic apparatus 300 via the RF reception unit 205 as a command. The CPU 201 controls the operation of the respective units in accordance with the command.

The antenna 209 receives a digital broadcasting signal or the like and inputs it to the tuner 210.

The tuner 210 extracts a broadcasting signal of a predetermined channel (e.g., channel designated by user via portable electronic apparatus 300) from the digital broadcasting signal. The tuner 210 outputs, to the descrambler 211, a transport stream of the predetermined channel obtained by applying demodulation processing to the broadcasting signal thus extracted.

The descrambler 211 descrambles the transport stream thus input from the tuner 210 using a descrambling key stored in advance in a predetermined IC card (not shown) loaded into the information processing apparatus 200. The descrambler 211 outputs, to the demultiplexer 212, the transport stream which has been descrambled.

The demultiplexer 212 separates audio data and video data from the descrambled transport stream input from the descrambler 211. The demultiplexer 212 outputs the audio data thus separated to the decoder 213 and the video data thus separated to the video decoder 214.

The audio decoder 213 decodes the audio data thus input from the demultiplexer 212 and inputs the audio data thus obtained to the audio processing circuit 215.

The audio processing circuit 215 D/A (Digital/Analog)-converts the audio data thus input from the audio decoder 213, executes amplification processing to the audio data, and outputs the audio signal thus obtained to the speaker 216.

The video decoder 214 decodes the video data thus input from the demultiplexer 212 and outputs the video data thus obtained to the GUI (Graphical User Interface) superimposer 217.

The GUI superimposer 217 superimposes graphic data such as OSD (On Screen Display) on the video data thus input from the video decoder 214 and outputs it to the video processing circuit 218.

The video processing circuit 218 performs predetermined image processing, D/A (Digital/Analog) conversion, and the like with respect to the video data thus input from the GUI superimposer 217, and outputs the video signal thus obtained to the display 219.

Further, the CPU 201 can similarly receive a digital broadcasting signal, obtain a transport stream of a predetermined channel, and store it in the storage 204 as video audio data of a program in accordance with the operation of the portable electronic apparatus 300.

It should be noted that although, in this embodiment, an RF signal is employed as a wireless communication medium, a wireless LAN that uses an access point, WiFi, Bluetooth (registered trademark), or NFC (Near Field Communication) may be employed besides IR (infrared ray) bidirection communication, for example. The same holds true for the first embodiment.

[Functional Configuration of Portable Electronic Apparatus]

Figure 15:
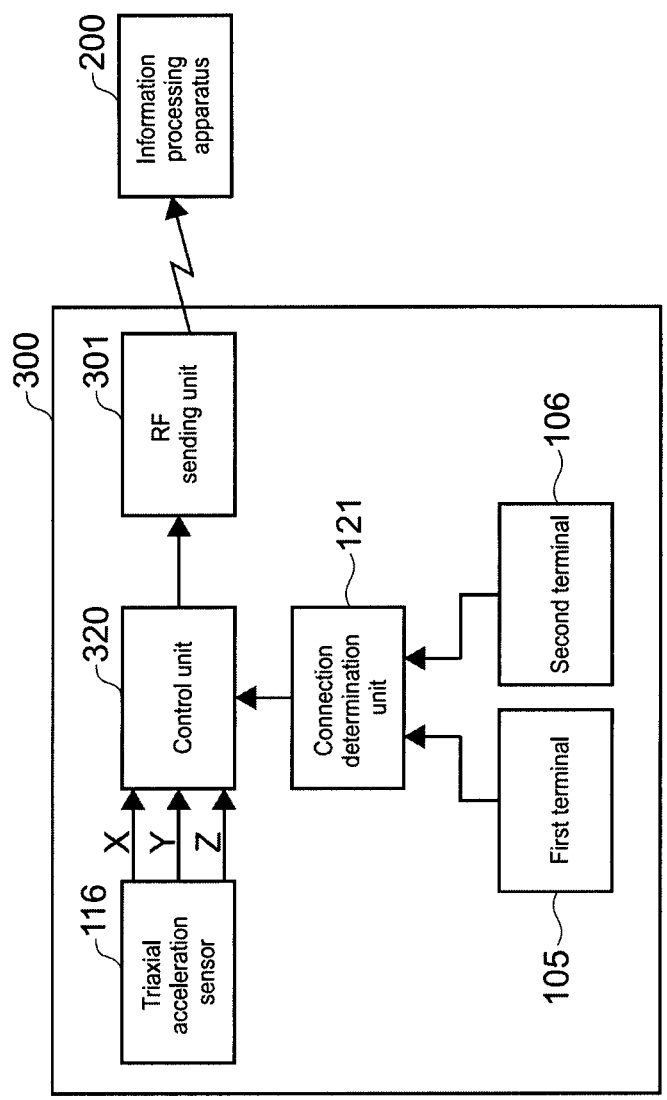
FIG. 15 is a block diagram showing a functional configuration of the portable electronic apparatus.

FIG. 15 is a block diagram showing a functional configuration of the portable electronic apparatus 300.

The portable electronic apparatus 300 includes a triaxial acceleration sensor 116, a control unit 320, a connection determination unit 121, and an RF sending unit 301.

When determining the change in connection states of the external apparatus to the first terminal 105 and the second terminal 106, the connection determination unit 121 supplies the change in connection states to the control unit 320 as the determination result. The control unit 320 sends, to the information processing apparatus 200, the connection states of the first terminal 105 and the second terminal 106, using the RF sending unit 301.

The control unit 320 A/D-converts and takes in three signals corresponding to the respective accelerations in the triaxial directions of XYZ that have been output from the triaxial acceleration sensor 116, and then obtains acceleration values Xo, Yo, and Zo in the triaxial directions of XYZ. The control unit 320 sends, to the information processing apparatus 200, the acceleration values Xo, Yo, and Zo in the triaxial directions of XYZ, using the RF sending unit 301.

[Functional Configuration of Information Processing Apparatus]

Figure 16:
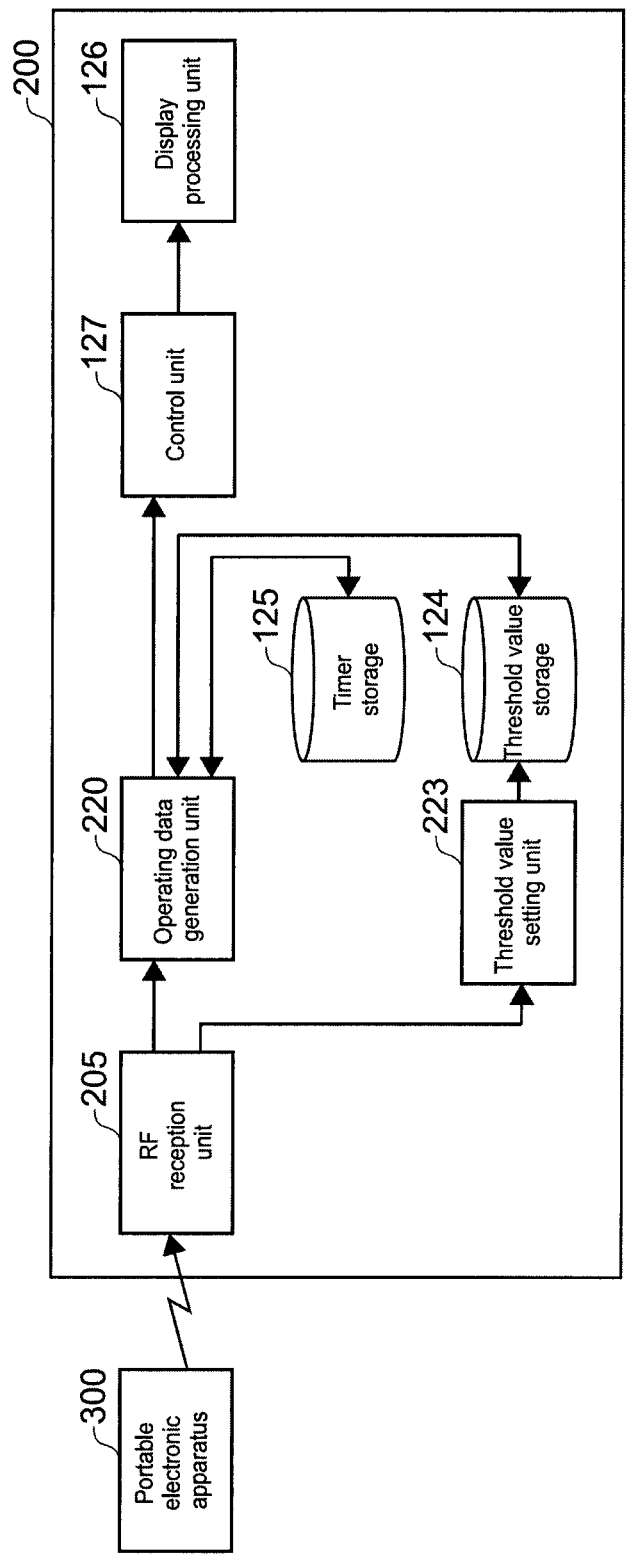
FIG. 16 is a block diagram showing a functional configuration of the information processing apparatus.

FIG. 16 is a block diagram showing a functional configuration of the information processing apparatus 200.

The information processing apparatus 200 includes an RF reception unit 205, an operating data generation unit 220, a threshold value setting unit 223, a threshold value storage 124, a timer storage 125, a display processing unit 126, and a control unit 127.

The operating data generation unit 220 obtains the acceleration values Xo, Yo, and Zo in the triaxial directions of XYZ from the portable electronic apparatus 300, using the RF reception unit 205. Other operations of the operating data generation unit 220 are the same as those of the operating data generation unit 120 of the first embodiment.

The threshold value setting unit 223 obtains the connection states of the first terminal 105 and the second terminal 106 as the determination result from the portable electronic apparatus 300, using the RF reception unit 205. Other operations of the threshold value setting unit 223 are the same as those of the threshold value setting unit 123 of the first embodiment.

Modified Example 1

In the third embodiment, the information processing apparatus 200 receives, from the portable electronic apparatus 300, the connection state of the terminal of the portable electronic apparatus 300 and information on the change in position of the portable electronic apparatus 300 in space. In contrast, the television receiver itself may obtain, by image recognition or the like, the connection state of the terminal of the controller and information on the change in position of the controller in space, for example.

The television receiver according to the modified example 1 includes a camera, and a mark is set on the controller. The control unit of the television receiver detects, by image recognition, the change in position of the mark in space taken by the camera, and executes processing corresponding to the change in position in space. Further, the control unit of the television receiver detects, by image recognition, the connection state of the external apparatus to the controller taken by the camera, and notifies the control unit of the television receiver and the threshold value setting unit. In the modified example 1, the camera plays a role of the detection unit configured to detect the change in position of the controller in space, and the camera and the control unit play a role of the connection determination unit configured to determine the connection state of the terminal.

It should be noted that the present disclosure can also employ the following configurations.

(1) An information processing apparatus, including:

an operating data generation unit configured to acquire detection information generated in accordance with a detection result of a detection unit capable of detecting a change in position of an electronic apparatus including a connection unit which is capable of connecting to a predetermined external apparatus in space, and generate operating data based on the detection information; and a connection determination unit configured to determine a connection state between the connection unit and the external apparatus, the operating data generation unit generating the operating data based on the connection state determined by the connection determination unit.

(2) The information processing apparatus according to (1), in which the operating data generation unit generates the operating data based on the detection information and a predetermined threshold value, the information processing apparatus further including a threshold value setting unit configured to set the threshold value in accordance with the connection state determined by the connection determination unit.

(3) The information processing apparatus according to (1) or (2), in which the detection information is information based on an acceleration of the electronic apparatus, and the threshold value setting unit sets a threshold value of an acceleration in a case where the connection determination unit determines that the connection unit and the external apparatus are connected with each other to be lower than a threshold value of an acceleration in a case where the connection determination unit determines that the connection unit and the external apparatus are not connected with each other.

(4) The information processing apparatus according to any one of (1) to (3), in which the detection information is generated in accordance with detections of accelerations of the electronic apparatus in triaxial directions by the detection unit, and the threshold value setting unit sets a threshold value of a specific acceleration which is an acceleration in a specific direction corresponding to a direction in which the external apparatus is connected to the connection unit to be lower than a threshold value of accelerations in biaxial directions other than the specific direction in a case where the connection determination unit determines that the connection unit and the external apparatus are connected with each other.

(5) The information processing apparatus according to any one of (1) to (4), in which the operating data generation unit calculates the number of inversions of acceleration of the electronic apparatus based on the acceleration detected by the detection unit, and the threshold value setting unit sets a threshold value of the number of inversions of acceleration to be set in a case where the connection determination unit determines that the connection unit and the external apparatus are not connected with each other to be higher than a threshold value of the number of inversions of acceleration to be set in a case where the connection determination unit determines that the connection unit and the external apparatus are connected with each other.

(6) The information processing apparatus according to any one of (1) to (5), in which the operating data generation unit calculates an inversion cycle of acceleration of the electronic apparatus based on the acceleration detected by the detection unit, and the threshold value setting unit sets a threshold value of the inversion cycle of acceleration to be set in a case where the connection determination unit determines that the connection unit and the external apparatus are not connected with each other to be lower than a threshold value of the inversion cycle of acceleration to be set in a case where the connection determination unit determines that the connection unit and the external apparatus are connected with each other.

(7) The information processing apparatus according to any one of (1) to (6), in which the electronic apparatus includes a first connection unit and a second connection unit as the connection unit, the connection determination unit determines which one of the first connection unit and the second connection unit has been connected to the external apparatus as the connection state, and the operating data generation unit generates the operating data based on the connection state determined by the connection determination unit.

(8) The information processing apparatus according to any one of (1) to (7), in which the operating data generation unit calculates a detection effective value from a difference between the detection information and the threshold value and generates the operating data based on the detection effective value.

(9) The information processing apparatus according to any one of (1) to (8), in which the threshold value setting unit sets a threshold value of accelerations in biaxial directions other than a specific direction, in which a user mainly moves the electronic apparatus, to be higher than a threshold value of an acceleration in the specific direction, the specific direction being determined in accordance with a position of the electronic apparatus including the connection unit to which the external apparatus is connected.

(10) The information processing apparatus according to any one of (1) to (9), further including:

a gesture recognition unit configured to recognize a predetermined operation gesture in accordance with a change in position of the electronic apparatus detected by the detection unit in space; and a display control unit configured to display a display image which represents the operation gesture on a display unit, in which the operating data generation unit generates the operating data in accordance with the operation gesture recognized by the gesture recognition unit.

(11) The information processing apparatus according to any one of (1) to (10), in which the display control unit changes a display image to be displayed on the display unit in accordance with the connection state determined by the connection determination unit.

(12) The information processing apparatus according to any one of (1) to (11), in which the operating data generation unit does not generate the operating data for a predetermined period of time corresponding to a timing at which the connection determination unit determines a change in the connection state.

(13) The information processing apparatus according to any one of (1) to (12), further including a processing execution unit configured to acquire the operating data and execute predetermined processing in accordance with the operation data thus acquired, in which the processing execution unit does not execute the processing for a predetermined period of time corresponding to a timing at which the connection determination unit determines a change in the connection state.

(14) The information processing apparatus according to any one of (1) to (13), in which the detection unit detects a change in position of the electronic apparatus in space by one of an acceleration sensor and image recognition.

(15) An information processing method, including:

acquiring, by an operating data generation unit, detection information generated in accordance with a detection result of a detection unit capable of detecting a change in position of an electronic apparatus including a connection unit which is capable of connecting to a predetermined external apparatus in space and generating operating data based on the detection information;

determining, by a connection determination unit, a connection state between the connection unit and the external apparatus; and generating, by the operating data generation unit, the operating data based on the connection state determined by the connection determination unit.

(16) A program that causes a computer to function as:

an operating data generation unit configured to acquire detection information generated in accordance with a detection result of a detection unit capable of detecting a change in position of an electronic apparatus including a connection unit which is capable of connecting to a predetermined external apparatus in space and generate operating data based on the detection information; and a connection determination unit configured to determine a connection state between the connection unit and the external apparatus, the operating data generation unit generating the operating data based on the connection state determined by the connection determination unit.

The present disclosure contains subject matter related to that disclosed in Japanese Priority Patent Application JP 2011-190201 filed in the Japan Patent Office on Aug. 31, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. In information processing apparatus, comprising:
an operating data generation unit configured to
    acquire detection information generated in accordance with a detection result of a detection unit configured to detect a change in position of an electronic apparatus including a connection unit which is capable of connecting to a predetermined external apparatus in space, and generate operating data based on the detection information; and
    generate the operating data based on the detection information and a predetermined threshold value, and
a connection determination unit configured to determine a connection state between the connection unit and the external apparatus, the operating data generation unit generating the operating data based on the connection state determined by the connection determination unit; and
a threshold value setting unit configured to set the threshold value in accordance with the connection state determined by the connection determination unit.

2. The information processing apparatus according to claim 1, wherein the detection information is information based on an acceleration of the electronic apparatus, and the threshold value setting unit sets a threshold value of an acceleration in a case where the connection determination unit determines that the connection unit and the external apparatus are connected with each other to be lower than a threshold value of an acceleration in a case where the connection determination unit determines that the connection unit and the external apparatus are not connected with each other.

3. The information processing apparatus according to claim 2, wherein the detection information is generated in accordance with detections of accelerations of the electronic apparatus in triaxial directions by the detection unit, and the threshold value setting unit sets a threshold value of a specific acceleration which is an acceleration in a specific direction corresponding to a direction in which the external apparatus is connected to the connection unit to be lower than a threshold value of accelerations in biaxial directions other than the specific direction in a case where the connection determination unit determines that the connection unit and the external apparatus are connected with each other.

4. The information processing apparatus according to claim 3, wherein the threshold value setting unit sets a threshold value of accelerations in biaxial directions other than a specific direction, in which a user mainly moves the electronic apparatus, to be higher than a threshold value of an acceleration in the specific direction, the specific direction being determined in accordance with a position of the electronic apparatus including the connection unit to which the external apparatus is connected.

5. The information processing apparatus according to claim 2, wherein the operating data generation unit calculates the number of inversions of acceleration of the electronic apparatus based on the acceleration detected by the detection unit, and the threshold value setting unit sets a threshold value of the number of inversions of acceleration to be set in a case where the connection determination unit determines that the connection unit and the external apparatus are not connected with each other to be higher than a threshold value of the number of inversions of acceleration to be set in a case where the connection determination unit determines that the connection unit and the external apparatus are connected with each other.

6. The information processing apparatus according to claim 2, wherein
the operating data generation unit calculates an inversion cycle of acceleration of the electronic apparatus based on the acceleration detected by the detection unit, and
the threshold value setting unit sets a threshold value of the inversion cycle of acceleration to be set in a case where the connection determination unit determines that the connection unit and the external apparatus are not connected with each other to be lower than a threshold value of the inversion cycle of acceleration to be set in a case where the connection determination unit determines that the connection unit and the external apparatus are connected with each other.

7. The information processing apparatus according to claim 1, wherein
the electronic apparatus includes a first connection unit and a second connection unit as the connection unit, the connection determination unit determines which one of the first connection unit and the second connection unit has been connected to the external apparatus as the connection state, and
the operating data generation unit generates the operating data based on the connection state determined by the connection determination unit.

8. The information processing apparatus according to claim 1, wherein
the operating data generation unit calculates a detection effective value from a difference between the detection information and the threshold value and generates the operating data based on the detection effective value.

9. The information processing apparatus according to claim 1, further comprising:
a gesture recognition unit configured to recognize a predetermined operation gesture in accordance with a change in position of the electronic apparatus detected by the detection unit in space; and
a display control unit configured to display a display image which represents the operation gesture on a display unit, wherein the operating data generation unit generates the operating data in accordance with the operation gesture recognized by the gesture recognition unit.

10. The information processing apparatus according to claim 9, wherein
the display control unit changes a display image to be displayed on the display unit in accordance with the connection state determined by the connection determination unit.

11. The information processing apparatus according to claim 1, wherein
the operating data generation unit does not generate the operating data for a predetermined period of time corresponding to a timing at which the connection determination unit determines a change in the connection state.

12. The information processing apparatus according to claim 1, further comprising
a processing execution unit configured to acquire the operating data and execute predetermined processing in accordance with the operation data thus acquired, wherein
the processing execution unit does not execute the processing for a predetermined period of time corresponding to a timing at which the connection determination unit determines a change in the connection state.

13. The information processing apparatus according to claim 1, wherein
the detection unit detects a change in position of the electronic apparatus in space by one of an acceleration sensor and image recognition.

14. An information processing method, comprising:
generating, via an operating data generation unit, operating data based on a detection information and a predetermined threshold value,
acquiring, by the operating data generation unit, detection information generated in accordance with a detection result of a detection unit capable of detecting a change in position of an electronic apparatus including a connection unit which is capable of connecting to a predetermined external apparatus in space and generating operating data based on the detection information;
determining, by a connection determination unit, a connection state between the connection unit and the external apparatus;
generating, by the operating data generation unit, the operating data based on the connection state determined by the connection determination unit; and
setting, by a threshold value setting unit, a threshold value in accordance with the connection state determined by the connection determination unit.

15. A non-transitory, computer-readable storage medium storing a program that causes a computer to function as:
an operating data generation unit configured to
acquire detection information generated in accordance with a detection result of a detection unit configured to detect a change in position of an electronic apparatus including a connection unit which is capable of connecting to a predetermined external apparatus in space and generate operating data based on the detection information; and
generate the operating data based on the detection information and a predetermined threshold value;
a connection determination unit configured to determine a connection state between the connection unit and the external apparatus, the operating data generation unit generating the operating data based on the connection state determined by the connection determination unit; and
a threshold value setting unit configured to set the threshold value in accordance with the connection state determined by the connection determination unit.

* * * * *